(No Model.) 2 Sheets—Sheet 1.

J. F. WINTER.
GOVERNOR FOR ELECTRIC MOTORS.

No. 517,714. Patented Apr. 3, 1894.

WITNESSES: INVENTOR
L. Isury VanHorn. J. F. Winter
Charles B. Mann Jr. By Chas B. Mann
ATTORNEY.

THE NATIONAL LITHOGRAPHING COMPANY,
WASHINGTON, D. C.

(No Model.) 2 Sheets—Sheet 2.
J. F. WINTER.
GOVERNOR FOR ELECTRIC MOTORS.
No. 517,714. Patented Apr. 3, 1894.
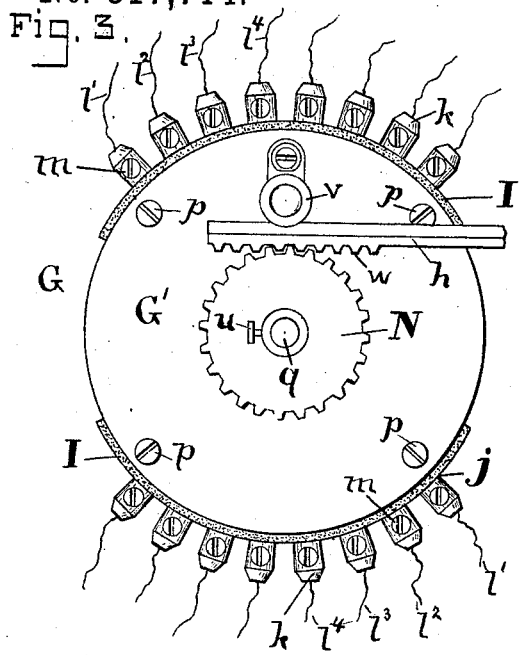
Fig. 3.
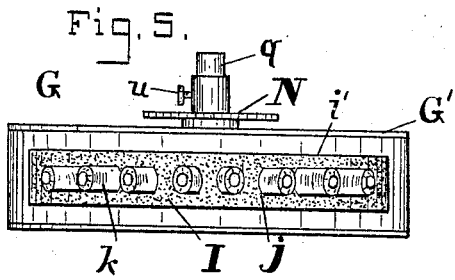
Fig. 5.
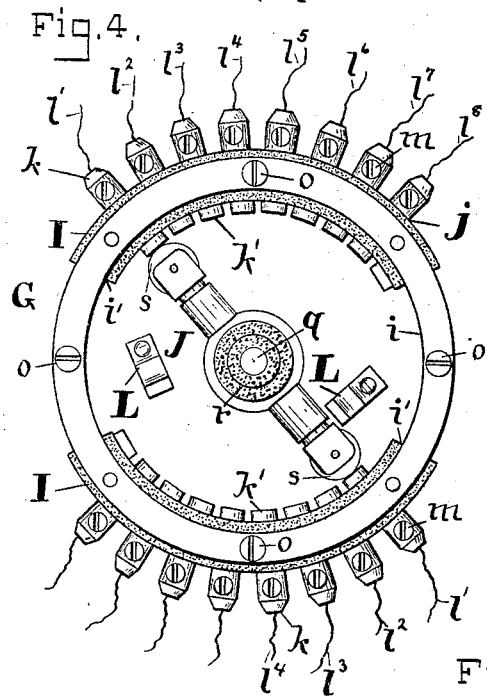
Fig. 4.
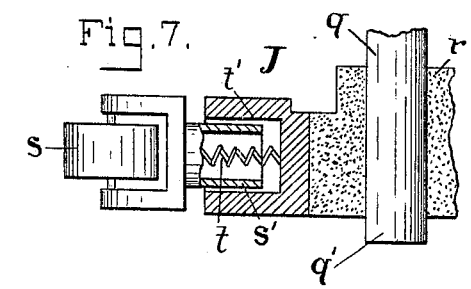
Fig. 6.
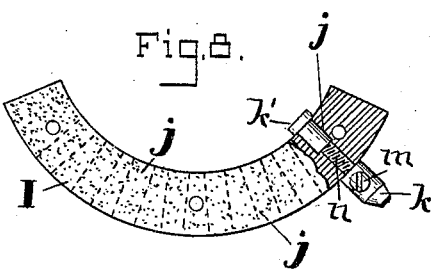
Fig. 7.
Fig. 8.
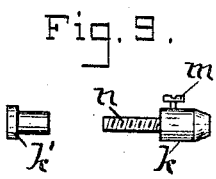
Fig. 9.
WITNESSES:
L. Ismy Van Horn.
Charles B. Mann Jr.
INVENTOR:
J. F. Winter
By Chas. B. Mann
ATTORNEY.

UNITED STATES PATENT OFFICE.

JOHN F. WINTER, OF BALTIMORE, MARYLAND, ASSIGNOR OF ONE-HALF TO JAMES FRANK MORRISON, OF SAME PLACE.

GOVERNOR FOR ELECTRIC MOTORS.

SPECIFICATION forming part of Letters Patent No. 517,714, dated April 3, 1894.

Application filed September 21, 1893. Serial No. 486,134. (No model.)

*To all whom it may concern:*

Be it known that I, JOHN F. WINTER, a citizen of the United States, residing at Baltimore, in the State of Maryland, have invented certain new and useful Improvements in Governors for Electric Motors, of which the following is a specification.

This invention relates to an automatic governor for regulating the speed of electric motors.

The objects are to provide a simple form of governor which will maintain a uniform speed of the motor by automatically shunting or short-circuiting the layers of the field magnet, thus either reducing or increasing the voltage; and to provide a dust-proof box to inclose and contain the contacts and shunt lever.

The invention is illustrated in the accompanying drawings, in which—

Figure 1:
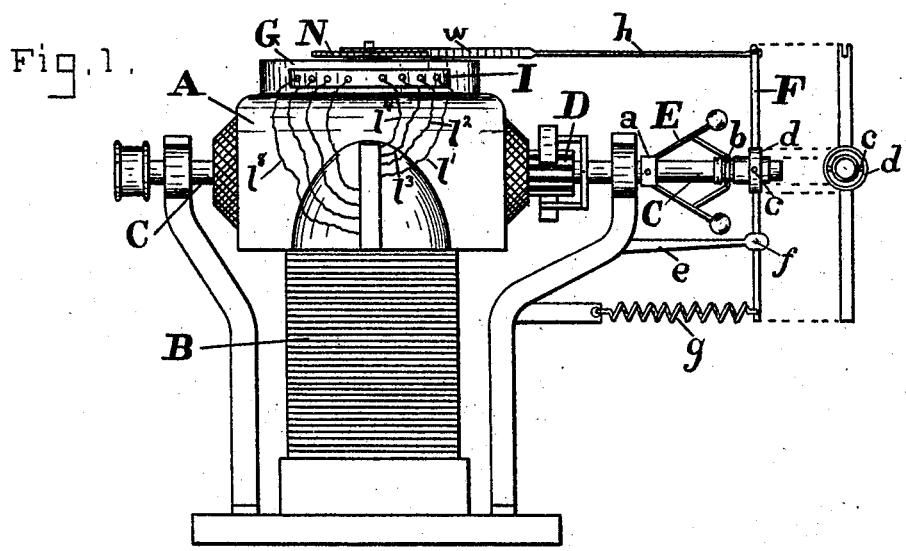
Figure 2:
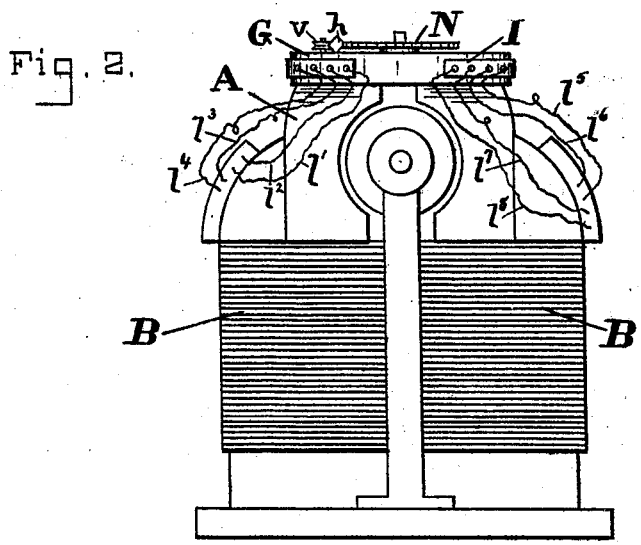

Figure 1 is a side elevation of a motor with my improved governor attached. Fig. 2 is a front end elevation of the motor showing the dust-proof box of the governor mounted thereon and the wiring which connects the governor-contacts with the layers of the field-magnet. Fig. 3 is a top view or plan of the dust-proof box and the wire connections. Fig. 4 is an inside view of the dust-proof box—the top cover being removed. Fig. 5 is a side elevation of the box. Fig. 6 is a side view of the bar or shunt-lever which is pivoted in the box and which carries the contact rollers. Fig. 7 shows a detail on a larger scale of the construction of the pivoted bar. Fig. 8 shows the segmental insulator-block. Fig 9 shows one of the binding sockets and contacts.

This governor may be attached to any motor. In the present instance the motor is shown in Figs. 1 and 2, A designating the frame, B the field-magnets, C the armature shaft, and D the commutator; these and the other parts of the motor are arranged in a familiar way. The weighted links, E, of the governor have their inner ends pivoted to a collar, $a$, fixed on the armature shaft, and their outer ends pivoted to a sleeve, $b$, adapted to slide on the shaft, but rotate with it; this sleeve carries a loose collar which does not rotate and has pivots, $c$, and a lever, F, has a ring, $d$, which is pivoted on the said pivots; an arm, $e$, projects from the motor-frame and the lever is pivoted at, $f$, on the arm; a spiral spring, $g$, connects one end of the lever with a suitable stationary support and the other end of the lever has a rod, $h$, jointed to it. The parts described to this point in the specification are well-known.

The dust-proof box, G, of my improved governor is mounted on the frame; whatever be the exterior shape of this box, the interior should be circular and have circular walls, $i$; on opposite sides of the walls is a recess or opening, $i'$, in which are placed segment-shaped insulator blocks, I, which have holes, $j$, for the reception of the binding sockets, $k$, and contacts, $k'$, of the shunts. Each binding socket, $k$, receives the end of one of the wires, $l'$, $l^2$, $l^3$, &c., which extend from the several layers of the field-magnet, and a screw, $m$, in the socket retains the wire; the socket has a screw-shank, $n$, which takes into a screw-threaded hole in the contact piece, $k'$, which latter has a flanged head. By this construction the body of the contact piece, $k'$, enters the inner side of the hole, $j$, in the insulator block while the head projects within the circular walled box; the binding socket has its screw-shank, $n$, entered into the outer side of the hole, $j$, where it engages and screws into the body of the said contact piece, while the socket part, $k$, takes against the exterior surface of the insulator block. All the heads, $k'$, which form the contact pieces, are thus arranged within the box in a part circle concentric with the center. A screw, $o$, in the wall of the box confines each insulator block; by loosening the screws one or both insulator blocks, I, may be removed, and with them all the contacts, $k'$. It will be seen that each contact is completely and separately insulated from the others; and any one of the binding sockets and contacts may be removed without disturbing the others. It will also be seen that with the cover, G', fitting close upon and secured on top of the walls, $i$, of the box by means of the screws, $p$, all dust and dirt that would be hurtful to or interfere with a perfect electrical contact with the contact heads, $k'$, is rigidly excluded. The center and bottom of the box has a socket-bearing (not shown) for the shaft pivot, $q'$, on the under side of the shunt-lever, J; this lever has a central shaft, q, and a bushing or ring, r, of insulating material is around the shaft and serves to insulate it from the metallic parts of the lever. Each end of the lever carries a contact-roller, s, which bears against the contact-heads, k', on the inner wall of the box; each of these rollers is pressed by a spring, t, outward from the central shaft, q, so as to insure that both rollers will make perfect contact. The construction to effect this latter object is shown in Fig. 7, where it will be seen that the ends of the lever have a socket, t', and the roller, s, is mounted similar to a caster wheel and has a shank, s', which fits in the said socket, t'. It will be clearly understood how the spring acts. Stop blocks, L, are secured to the bottom of the box and serve to limit the throw or partial rotation of the shunt-lever. This lever is inclosed, together with the contact-heads, k', in the dust-proof box, the cover, G', thereof excluding all dirt, and thereby these parts are maintained in good condition and a perfect electric circuit insured. The central shaft, q, projects through the cover and on the outside carries a pinion, N, secured by set-screw, u. A grooved roller, v, is secured in any suitable way on the cover of the box, and the rod, h, has rack-teeth, w, which engage with the teeth of the pinion, N; the rack-rod being connected with the lever, F, has an endwise reciprocating movement caused by the fluctuations of speed of the motor, and as the rod passes between the grooved roller, v, and the pinion the roller serves to keep the rack-bar in engagement with the pinion.

From the foregoing description it will be seen that the shunt-lever is automatically operated by the pinion, N, and the rack-rod, h, and that the circuit through the shunt-box is changed by the swing of the lever bringing its contact roller, s, in coincidence with opposite contact-heads, k'; the mode of operation being that an increase of speed in the motor causes the governor to cut-out or short-circuit more or less of the layers or coils of the magnet.

It is obvious that in carrying out my invention certain details of construction may be varied or modified without departing from the essence of my invention as hereinafter claimed.

Having thus described my invention, what I claim as new, and desire to secure by Letters Patent, is—

1. An automatic governor for electric motors having in combination a closed dust-proof box; a shaft in the box having an end projecting outside; two sets of stationary contacts within the closed box and insulated where they pass through the walls of the box and each set arranged in a part circle concentric with the said shaft; and a shunt-lever in the box and mounted on the shaft.

2. An automatic governor for electric motors having in combination a closed dust-proof box; a shaft in the box having an end projecting outside; two sets of stationary contacts within the closed box and each set arranged in a part circle concentric with the said shaft and insulated where they pass through the walls of the box; a shunt-lever in the box and mounted on the shaft; a toothed pinion on the outer projecting end of the said shaft; a roller adjacent to the toothed pinion; a rack-bar held in engagement with the pinion by said roller and adapted to reciprocate endwise; weighted governor links, E, suitably carried by the armature shaft of the motor; and a lever moved by the shifting of said governor links and connected with the rack-bar.

3. An automatic governor for electric motors having in combination a dust-proof box provided with openings in its side walls; segmental-shaped insulator blocks in said openings and provided with radial holes; contact-pieces secured in the said radial holes; a shunt-lever pivoted in the box so that when partially rotating its ends will make contact with the said contact-pieces; and a cover to close the box and exclude the dust and dirt from the said parts which are inclosed.

4. An automatic governor for electric motors having in combination a closed dust-proof box provided with segmental-shaped insulator blocks in its side walls; headed contact-pieces, k', in said insulator blocks—the heads projecting on the inner side; wire-binding sockets having screw-shanks—each shank entered into the insulator blocks from its outside and engaging one of the said headed contact-pieces; and a shunt-lever pivoted in the closed box so that when partially rotating its ends will make contact with the said projecting contact-heads.

5. An automatic governor for electric motors having in combination a closed dust-proof box; two sets of stationary contact pieces within the closed box and insulated where they pass through the walls of the box and arranged in a part circle concentric with the center; and a shunt-lever pivoted in the center of the closed box and having spring-pressed end-pieces to make contact with the said stationary contact-pieces.

In testimony whereof I affix my signature in the presence of two witnesses.

JOHN F. WINTER.

Witnesses:
C. C. HINES,
CHARLES B. MANN, Jr.